UNITED STATES PATENT OFFICE.

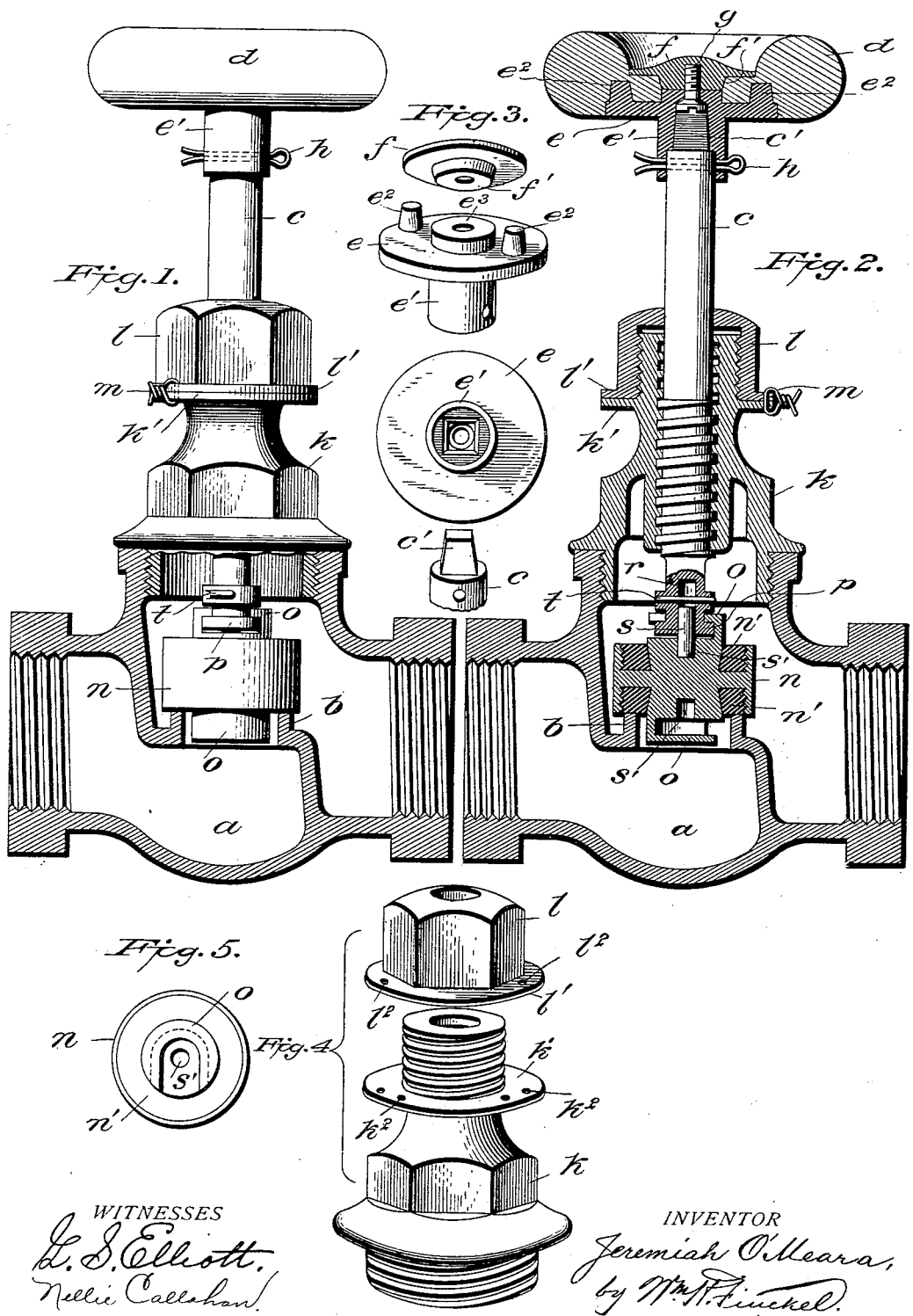

JEREMIAH O'MEARA, OF NEW YORK, N. Y.

VALVE.

SPECIFICATION forming part of Letters Patent No. 623,418, dated April 18, 1899.

Application filed November 19, 1898. Serial No. 696,886. (No model.)

*To all whom it may concern:*

Be it known that I, JEREMIAH O'MEARA, a citizen of the United States, residing at New York, in the county of New York and State of New York, have invented a certain new and useful Improvement in Valves, of which the following is a full, clear, and exact description.

This invention relates more particularly to that class of valves which are used on steam-radiators of steam-heating plants, although the invention is of value in connection with valves for every use.

The invention comprises, first, means for preventing the surreptitious and accidental removal or displacement of the hand-wheel; second, a stuffing-box or gland and a bonnet provided with parallel flanges and means to connect them, so as to prevent the running off of the stuffing-box or gland in turning the valve-stem, and, third, a reversible valve and means for connecting it with the valve-stem, all as I will proceed now more particularly to set forth and finally claim.

In the accompanying drawings, illustrating my invention, in the several views of which like parts are similarly designated, Figure 1 is a sectional elevation, and Fig. 2 is a vertical section, of one form of valve embodying my several improvements. Fig. 3 is a perspective view showing parts used to connect the hand-wheel with the stem, so as to prevent accidental or surreptitious removal or displacement of such hand-wheel. Fig. 4 is a perspective view of one form of stuffing-box or gland and bonnet. Fig. 5 is a plan view of the reversible valve-disk.

I have shown my invention applied to an ordinary globe-valve, such as is used on steam-heat radiators.

$a$ may represent the valve-shell, and $b$ the valve-seat.

$c$ is the stem, the upper end of which is provided with a squared or other angular portion $c'$.

$d$ is the hand-wheel, which may be of wood or other suitable material or substance, having a recess in its under side, into which is fitted the plate $e$, having the socket-piece $e'$, which is adapted to receive a portion of the circular portion of the stem and the whole of the angular portion $c'$. This plate $e$ may be provided with the lugs $e^2$ to engage holes in the hand-wheel $d$, so as to connect the two against independent rotation.

$f$ is a nut fitted to the upper side of the hand-wheel, and this nut and the plate $e$ have the bosses $f'$ $e^3$, respectively, which come into metallic contact one with the other.

$g$ is a screw inserted from the socket $e'$ into the nut $f$, and thereby clamping the parts of the wheel firmly together and constituting a concealed or blind joint therefor. The socket $e'$ is provided with a transverse hole, as is also the round portion of the stem $c$, and when these parts are assembled they are connected by any suitable pin, preferably a cotter-pin $h$. I make the outer surface of the nut $f$ perfectly smooth, and thereby prevent the application thereto of a tool for removing it, and hence I term said nut a "blind" nut. It follows, therefore, from the construction described that the hand-wheel cannot be accidentally or surreptitiously removed from the stem.

The surreptitious removal of the hand-wheels from radiator-valves in large buildings containing many tenants is a source of considerable annoyance and loss, and by my construction this evil is in a very large measure corrected. The cotter-pin or other fastening $h$ used is to be applied with such permanence that it would be necessary to destroy it before the hand-wheel could be disconnected at that point.

Another source of annoyance is the running off or working loose of the stuffing-boxes or glands of that class of valves which employs a screw-threaded stem whose screw-thread coöperates with a complemental screw-thread in the bonnet and whereby as the stem is rotated it is likewise moved in the direction of its length. In practice it is found that this rotary reciprocating motion of the stem tends to run off or work loose the stuffing-box or gland. In order to overcome this difficulty, I construct the bonnet $k$ with a laterally-projecting flange $k'$ and the stuffing-box or gland $l$ with a similar flange $l'$, and when these two members are in position they are locked together by twisting a wire, as $m$, through holes $k^2$ and $l^2$, respectively, in the flanges of the bonnet and stuffing-box. Any other medium than the twisted wire for locking these parts together may be employed so long as it is adapted to remain in position and hold the parts together, whether the valve be erected with its stem upright or turned downward or in any intermediate position. A fugitive fastening, such as the twisted wire, is preferred, because of facility in removing and replacing it when the box or gland has to be adjusted to stop a leak around the valve-stem.

The valve-disk *n* is shown as provided with packing *n' n'* in opposite faces, so that it may be reversed for use with different fluids or when one packing or face is worn. Integral with the metal part of this disk are the two sockets *o* and *o*, of ordinary undercut construction, but projecting beyond the respective faces of the disk. The inner end of the stem is made with a head *p*, grooved to engage the undercut sockets, and the said stem is provided with a longitudinal recess *r*. Within this recess *r* is arranged a pin *s* in such manner that when the stem is turned upside down the pin will fall wholly within the recess, and then when the disk is applied to the stem and the parts inverted the said pin will fall and enter a recess *s'* in the disk, and thus prevent the lateral displacement of the disk from the stem. In order to lock the pin in this position, the stem is provided with a transverse hole, in which is placed a removable wire *t*, crossing the recess *r* beyond the inner end of the pin *s*.

I am aware, of course, that a reversible disk is older than this present invention and also that it is not new here to connect the disk and stem by the longitudinal pin and the cross-pin; but I am not aware that it is old prior to this present invention to provide a reversible disk with stem-sockets projecting beyond its faces and combining therewith the pin-and-wire connection.

What I claim is—

1. In a valve, a stem having an angular end, a hand-wheel composed of parts connected by a concealed or blind fastening and provided with an angular socket, and a permanent fastening passed transversely through the socket and stem, substantially as described.

2. The combination of a valve-stem having an angular end, a hand-wheel having an angular socket, a blind nut applied to the hand-wheel, a connection between the nut and the hand-wheel made independently of the stem and concealed within the socket, and independent means to fasten the hand-wheel to the stem, substantially as described.

3. The combination of a valve-stem having an angular end, a hand-wheel having an angular socket, a blind nut applied to the hand-wheel, a connection between the nut and the hand-wheel made independent of the stem and concealed within the socket by aid of the stem, and a cotter-pin, passed transversely through the socket and stem, to unite the hand-wheel and stem, substantially as described.

4. A hand-wheel for valves, comprising a wooden or equivalent portion, a metal socket-plate secured thereto against rotation, a blind nut and a blind screw connecting the socket-piece and nut and uniting the several parts of the wheel independently of the valve-stem, substantially as described.

5. A valve, having a stem which has a rotary reciprocating motion, a bonnet provided with a laterally-projecting flange, and an adjustable, screw-threaded stuffing-box or gland surrounding the stem and also provided with a similar laterally-projecting flange and adapted to be adjusted to stop leaks about the valve-stem, the said flanges being perforated and provided with a wire applied through the holes in the flanges and its ends interlocked to lock the two flanges together and thereby prevent the running off of the stuffing-box or gland as the stem is actuated, substantially as described.

6. In a valve, a reversible disk having stem-sockets projecting from opposite faces and beyond said faces, a valve-stem adapted to engage one or the other of said sockets, the stem and the disk having longitudinal recesses, a locking-pin arranged in said recesses, and a pin-retaining device passed transversely through the stem, substantially as described.

In testimony whereof I have hereunto set my hand this 17th day of November, A. D. 1898.

JEREMIAH O'MEARA.

Witnesses:
J. H. CURRY,
JOSEPH P. HOUSTON.